United States Patent [19]
Stockman

[11] 3,915,061
[45] Oct. 28, 1975

[54] METHOD FOR ENGRAVING GRAPHICAL REPRESENTATIONS UPON WORKABLE MATERIALS

[76] Inventor: John H. Stockman, 628 Vineyard Point Road, Guilford, Conn. 06437

[22] Filed: May 24, 1974

[21] Appl. No.: 473,010

Related U.S. Application Data

[63] Continuation-in-part of Ser. No. 357,890, May 7, 1973, abandoned.

[52] U.S. Cl. .................. 90/11 C; 90/13.1; 90/62 R
[51] Int. Cl.² .... B23C 1/00; B23C 1/16; B23D 1/30
[58] Field of Search ......... 90/62 R, 13.1, 13.2, 11 C

[56] References Cited
UNITED STATES PATENTS

| | | | |
|---|---|---|---|
| 684,971 | 10/1901 | Barr | 90/62 R |
| 732,154 | 6/1903 | Barr | 90/62 R |
| 732,694 | 7/1903 | Austin | 90/13.1 |
| 2,656,604 | 10/1953 | Scruggs | 90/13.1 X |

*Primary Examiner*—Gil Weidenfeld
*Attorney, Agent, or Firm*—Stefan J. Klauber

[57] ABSTRACT

A method for engraving three-dimensional graphic intelligence upon workable stock, utilizing a three-dimensional pantograph engraving machine. A master is prepared wherein the graphics are defined by V-cut channels, the depth of which are proportional to the width of the graphic at the surface of the master. The master is positioned at the master object receiving bed of the pantograph machine and is traced in a single pass, utilizing as the tracing element a conical-tipped stylus having an included angle no greater than the included angle of the V-cut channel. A work cutting tool moves homologously with the stylus to cut the workable stock. The tool is adapted to sweep a cone during rotation, whereby a graphic is produced having an outline at the surface of the work piece which is geometrically similar to the outline of the graphic on the master, and a depth of each point similar to the vertical excursion of the tracing element during its pass through the V-channel of the master.

3 Claims, 10 Drawing Figures

METHOD FOR ENGRAVING GRAPHICAL REPRESENTATIONS UPON WORKABLE MATERIALS

BACKGROUND OF INVENTION

This application is a continuation-in-part of my copending application, Ser. No. 357,890, filed May 7, 1973, for "Method and Apparatus for Engraving Graphical Representations on Workable Materials"-now abandoned.

This invention relates generally to methods and apparatus for producing inscribed graphic representations on workable material, and more specifically relates to method and apparatus for engraving such representations upon wood, metal or other materials.

The presentation of graphic material such as words, symbols, and similar alpha-numeric information, and of other graphic intelligence by inscribing such intelligence upon workable materials, is an art that is almost as old as civilization itself. Needless to say, however, such art remained for centuries a laborious skill, the results of which depended upon the individual artisan's talents and available time. Considering more specifically one particular field to which the present invention has application, it may thus be noted that wooden signs, such as those identifying the occupant of a home, or a business establishment, etc., were, prior to the industrial revolution, produced by hand-carving the required information upon the wood or other workable stock. Within recent times, however, such hand carving has become a little practiced art, in that not only are the required skills in very short supply, but moreover labor costs have become so high as to all but preclude use of these techniques.

Here it may be noted that while early inscribing techniques such as mentioned above for inscribing wooden materials, utilized simple hand carving tools, hand engraving with rotating tools is now widely utilized, as for example, in the customized engraving of silverware, jewelry, etc. and in corresponding processes for engraving graphic information on stone surfaces such as monuments or the like. These techniques are basically updated versions of early hand carving methods. As is well known, however, the cost of such procedures is exceedingly high, and needless to say does not lend itself to any mass production operations.

The typical mass produced carved letter sign, such as for example, the name posts utilized at a home owner's premises, or as another example a nameplate utilized in an office or the like, is in fact machine-produced with a pantograph apparatus. These pantograph apparatus are well-known in the art, and basically consist of a cutting tool and a linked tracing stylus. A stencil carrying the appropriate alpha-numeric matrix or other information, is positioned so that the stylus may be applied to desired letters, and as the said letters are traversed the cutting tool follows in homologous fashion, cutting into the surface of the work piece. In the principal techniques followed in the past, it has been contemplated that both cutting tool and stylus substantially move in only two dimensions during the process. What basically happens therefore, is that the cutting tool proceeds at a fixed depth within the work piece, in consequence of which these low cost signs display letters wherein the cut lines are characterized by uniform depth; and wherein the width of the cut lines, if variable, is achieved by multiple passes of the cutter as the same depth. Unrounded corners, that is to say, sharpness in the corners, is not possible pursuant to such approach as the cutter traces an arc at the end of each line which is cut.

Those who are familiar with the discussed arts, are thus abundantly aware of the vast differential in appearance, as between lettering created by hand engraving or carving techniques, and the lettering provided by conventional pantograph machine cutting methods; and it may be noted that even the uninitiated readily observe the far more aesthetically appealing characteristics of the hand engraved graphics. Here it may be noted that an analysis of objects produced by the two techniques, establishes the basis for the distinctions mentioned. Such analysis reveals that hand engraved letters and symbols are typically characterized, not only by a variation in width of the various portions of the letters, but moreover by variations in depth of cut into the stock, which bears a relationship to the width of the letter or other representation at the given point. These characteristics will become increasingly evident in the ensuing specification, but it may be noted that in consequence of the cited relationship completely sharp corners are evidenced only in the hand-carved letters, and moreover aesthetically appealing shadows and contrasts are introduced by the variable depths and widths of the said symbols.

The aforementioned pantograph machines, are not in all instances limited to the two dimensional mode of operation. Indeed, pantograph machines are also known which are capable of three-dimensional use, that is to say, use wherein the cutting tool may follow the stylus not only with respect to the stylus movements in a plane, but also with respect to vertical variations above and below the said plane. In the past, however, the principal manner in which such three-dimensional machines have been contemplated for use in three-dimensional applications has been as follows: presume that a duplicate is to be made of a three-dimensional graphic representation, or of other form which can be followed by the stylus. Utilizing a cutting tool of relatively small dimensions, one endeavors to pass the stylus over and contact all accessible surface points of the presentation or object to be duplicated. The cutting tool in consequence removes small portions of the work piece as each point of the corresponding surface (of the master) is contacted by the stylus. If accordingly, the operator is indeed skillful and careful to assure that all points on the master surface are contacted through repeated passes of the stylus and cutter, a duplicate will be substantially provided. It will, however, be clear from the description of the technique set forth, that much skill and investment of time is required to achieve a good result.

In some instances it may be further noted, proposals have been made for other techniques utilizing three-dimensional pantograph machines for providing graphic engraving on work pieces. In U.S. Pat. No. 741,442, one of a series of patents to an early investigator, M. Barr, it is, for example, contemplated that a line engraving may be produced on a work piece by initially providing an enlarged photograph of the graphic to be reproduced, and transferring or affixing the said photograph on a slab of gypsum or similar frangible material. Thereafter it is contemplated that one substitutes for the usual tracer element a rotating conical cutting tracer, which is homologous with the engraving tool.

Thereupon one passes the cutting tracer over the photograph and manually lowers or raises the cutting-tracer, so that it may penetrate more or less deeply into the pattern, and by reason of its conicity cut a wider and deeper or narrower and shallower furrow, the object being to cut away all and no more than the lines of the pattern. The engraving tool moving in homologous fashion, thereby providing a corresponding three-dimensional engraving. This technique, while of considerable interest, has little practical value in that firstly a vast amount of time and effort is involved in preparation of the "master", which is then promptly destroyed in the very act of providing the duplicate engraving. Perhaps of at least equal significance, is the fact that the technique used requires that the operator at all times exercise demanding judgement and manual control in keeping the cutter precisely within the confines of the photograph master.

In another patent of the same M. Barr, U.S. Pat. No. 684,971, there is described a technique for producing engraved plates for use in printing applications. In particular, a plate is utilized having a pattern consisting of incised lines or grooves to a greater or lesser depth according to their width. As the grooves are traced, a cutting tool capable of vertical motion is linked by a pantograph connection to follow the movements of the tracer tool, whereby it produces an engraving which is characterized by increase in depth of the line with an increase in width. The consequence of this arrangement, as indicated in the patent, is that the printed character which results from use of the engraved plate, has a greater body of ink on it per unit of area in the case of a wide line than it has in the case of a narrow line.

In accordance with the foregoing, it may be regarded as an object of the present invention, to provide method and apparatus which enables production of engraved graphics at extremely low cost, and without the utilization of skillful personnel, which graphics, however, are equal in quality to the best hand-engraved products.

SUMMARY OF INVENTION

Now in accordance with the present invention, the foregoing object and others as will become apparent in the course of the ensuing specification, are achieved through method and apparatus combinations, based upon use of a conventional three-dimensional pantograph engraving machine. The latter machine, as is known in the art, conventionally includes a bed for receiving the "master" object to be reproduced, a tracing stylus overlying the bed and adapted to be passed in contact with surface portions of the object to be simulated, and a work-piece receiving station adapted to receive a piece of work stock. A rotating cutting tool is linked through a pantograph linkage to the tracer stylus as to move homologously therewith, thereby providing cutting action at the work piece location, which is homologous with respect to the traced movements at the original object.

In accordance with one aspect of the present invention, there is initially positioned as said "master" object, a stencil plate. Such plate carries thereon voids, the boundaries of which at the plate surface define the identity of the graphics to be engraved at the work piece. The tracing stylus comprises a conical-tipped element, the conical portion of which has an included angle and an axial length in relationship to the voids, such that the stylus may traverse the entire graphic defined by a void or series of voids, with the edges of the cone at all times contacting and being limited in downward movement by the lateral boundaries of the voids. By this arrangement the vertical excursions of the stylus into the voids varies in accordance with the separation of the restraining lateral edges of the void at the surface of the plate. The cutting tool comprises a rotating cutting head, the tip of which is adapted to sweep a cone during rotation thereof. Accordingly, with the cutting tool in contact with a first work piece, and with the said tool undergoing three-dimensional excursions homologous to those of the stylus, a graphic may be cut having an outline at the plane surface of the first work piece which is geometrically similar to the outline of the graphic on stencil; and furthermore the cut graphic will have a depth at each point thereof corresponding to or similar to the depth of descent of the tracing element during passage through the voids defining the graphic at the stencil. The stencil plate referred to may comprise a flat piece of material wherein the voids defining the graphics comprise flat walled cutouts into or through the plate. The width of the cutouts, at the surface of the plate corresponds to the desired form of the graphic to be cut. The plate itself may be of sufficient thickness to enable the required excursions, or a thin plate may be maintained during the cutting operations in spaced relationship from an underlying surface to permit the required excursions. The included angle of the tracer stylus tip and of the conical portion of the cutting tool are preferably the same; however, differing angles may be utilized in order to achieve desired effects. Similarly the pantograph machine may be set to provide a 1:1 ratio in the homologous movements of the tracer stylus and cutting tool, or differing ratios may be used to enable comparative enlargement or diminution of the graphic cut on the work piece as opposed to that on the stencil plate.

The first work piece—which may now be referred to as the "master"—is now seen to include graphics which are defined by V-cut channels, the depth of which are proportional to the width of the graphics at the surface of the said master. This master may then be positioned at the master object receiving bed of the pantograph and traced in a single pass, utilizing as the tracing element a conical-tipped stylus having an included angle no greater than the included angle of the V-cut channel. A work cutting tool moves homologously with the stylus to cut workable stock. The tool is adapted to sweep a cone during rotation, whereby a graphic is produced on the stock having an outline which is geometrically similar to the outline of the graphic on the master, and a depth at each point similar to the vertical excusion of the tracing element during its pass through the V-cut channels of the master.

BRIEF DESCRIPTION OF DRAWINGS

The invention is diagrammatically illustrated, by way of example, in the drawings appended hereto in which:

FIG. 7 illustrative how the use of differing included angles in the paired stylus and cutter of FIG. 3, affects the properties of the resulting master; and FIG. 8 illustrative use of the V-cut master with a stylus having an included angle less than that of the V-cut channel.

DESCRIPTION OF PREFERRED EMBODIMENT

Figure 1:
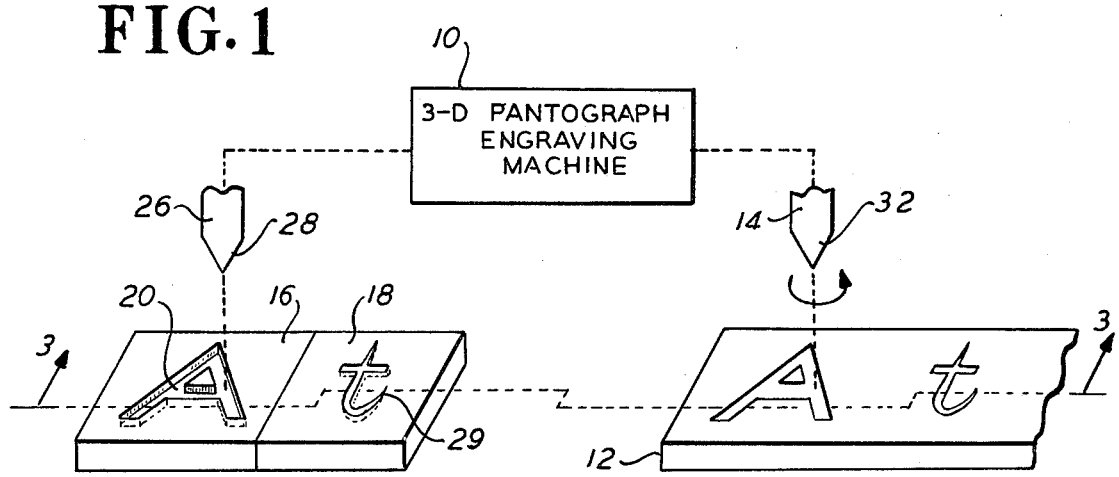
FIG. 1 is a perspective, highly schematic view, illustrating a method for preparing a master in accordance with the present invention.

In FIG. 1 herein a perspective, highly schematic view is set forth, depicting the basic operations of method and apparatus in accordance with the present invention. As has been previously indicated, the invention utilizes a so-called three-dimensional pantograph engraving machine, which is schematically illustrated by the block 10 in FIG. 1. It should be understood in this connection that the said machine 10 is not per se of the present invention, an accordingly no attempt is made herein to illustrate the said machine. In point of fact, such machines have been known for very many years, early versions thereof dating well back to the early part of the present century. A suitable model for present purposes, for example, is available from Scripta S.A., Paris 11, France, under the model designation SR3D. The machines in question are principally characterized as including a master receiving bed, at which an object to be followed with a stylus is normally mounted, and a work-receiving station at which the block of material, such as wood, plaster, metal, or other workable stock is mounted. A rotatable driven shaft generally overlies the work-receiving station, and is powered by suitable motor means. The said shaft which is adapted to receive some type of cutting tool or the like, is connected through the usual pantograph linkage of the said machine to the stylus, so that as the stylus is made to pass over the surface of the master (after suitable alignment is first made between the surface of the master and the work stock and the cutter and stylus) the cutting tool will then traverse in homologous fashion over portions of the work piece. As has been previously indicated, and although such mode has not normally been used in the cutting of graphics, this type of machine is capable of a use wherein as the stylus progresses over various portions of the master surface, the cutting tool cuts away at the work piece to produce a surface having point-to-point conformance with the specific spatial points traced by the stylus. As used here the word "master" refers, of course, to the object placed at the master receiving bed of the pantograph apparatus.

In accordance with the present invention, methods are set forth enabling highly useful new resuts to be achieved with the above-described pantograph machines. In order to concretely illustrate the mode of operation of the present invention, it may be assumed in FIG. 1, that a block of material is positioned as the work piece 12 at the aforementioned work piece receiving station of apparatus 10. Work piece 12 may constitute any of a variety of materials that are workable by the rotatable cutting tool 14 utilized in the invention, and may therefore be constituted of wood, plastics, ceramics, metals or other workable materials. Since, however, piece 12 will itself ultimately be used as a master, it is desireable that it be relatively durable, in order to enable numerous tracings with a stylus. Piece 12 is therefore preferably formed of a tough, long wearing material such as a lucite, a PVC-type plastic etc. For purposes of concretely illustrating the FIG. 1 process, it may be assumed that a graphic representation is to be placed on piece 12, such as a lettered sequence "At".

Figure 2A:
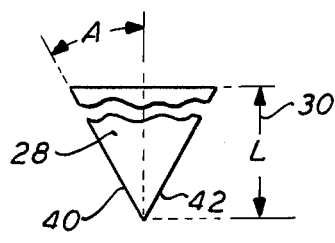
FIG. 2A is a simplified schematic view of the conical portion of the stylus utilized in FIG. 1.

In order to provide the desired cut graphic sequence, there is positioned at the master receiving bed a series of stencil plates, such as at 16 and 18, which in totality provide the desired graphic sequence. Of course, it is equally within the province of the invention for a single such plate to be utilized containing the desired information. Referring particularly, for example, to the plate 16, it is seen that such plate comprises a slab of material, for example, of metal, plastic or other relatively durable substance, into which is cut voids 20, which define a given graphic such as the character "A" on plate 16. In the embodiment of the invention appearing in FIG. 1, as best seen by reference to the cross-sectional view of FIG. 3, the said voids 20 are bounded by walls 22, which are perpendicular to the surface 24 of the plate 16. These walls 22 descend into the material to a common level, and may pass completely through the material, as it is not the depth of the voids that is of significance but only the spacing d between void edges 44 and 48 as the surface 24 of the plate (provided however that the depth of the voids be sufficient in consideration of A and L to enable the said edges to constitute the restraints on the stylus descent). The stylus 26 includes a conical tip 28. Details of the said conical tip 28 are best seen in the schematic depiction of FIG. 2A, from which it is observed that such tip is characterized by an included angle A at the cone, with the conical tip further having an axial length 30 of value L. The said stylus 26 does not in any manner rotate, but is merely intended to traverse the voids defining the graphic intelligence.

Figure 2B:
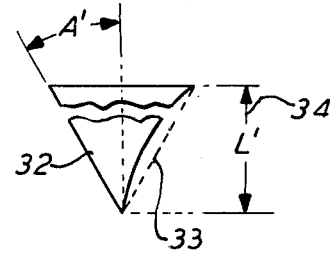
FIG. 2B is a schematic view similar to that of FIG. 2A, and setting forth certain geometric characteristics of the rotatable cutting tool portion of the FIG. 1 apparatus.

Continuing to refer to FIG. 1, it is further seen that the rotatable tool 14 is also characterized as having a cutting tip 32, which although including a cutting edge 33, is adapted on rotation to sweep a conical volume, and hence may be referred to as a "conical" cutting tip. Details of this conical tip 32 are agains best seen in the simplified schematic of FIG. 2B, from whence it is seen that the said tip has an included angle at the cone of A', and that further the axial length of tip 32, as indicated at 34, has a value L'. For purposes of illustrating the present invention, it may be initially assumed that the included angles A and A' respectively of conical stylus and cutting tool tips, are equal; however, it will be appreciated from what now ensues, that in general this need not be the case.

Figure 3:
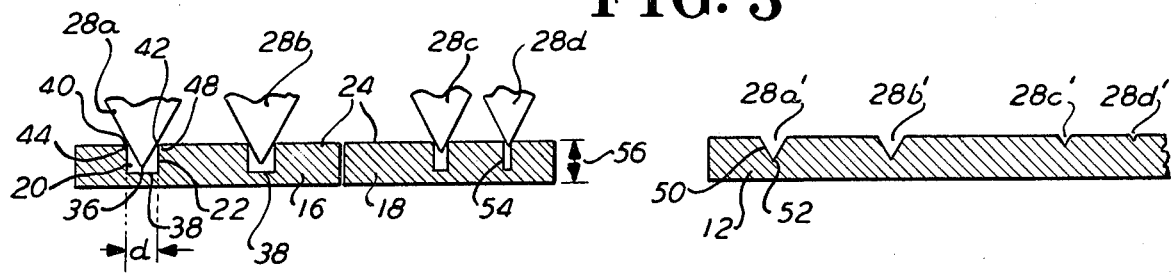
FIG. 3 is a simplified view, taken along the broken line 3—3 of FIG. 1, and illustrates the manner in which the master is cut by the FIG. 1 techniques.

The cross-sectional view of FIG. 3 illustrates the manner in which the stylus 28 is made to traverse varying portions of the voids defining the graphics at plates 16 and 18. The stylus is indicated by 28a, 28b, 28c and 28d to illustrate several different positions in its path of traverse, but it will of course be understood that the same stylus is depicted at each of these said points. Firstly, it will be noted that the included angle A of the stylus and the overall axial length L of conical tip 28, is so designed that as the stylus conical tip 28 traverses the various voids in plates 16 and 18, the apex 36 of the stylus tip will in general not descend to the bottom 38 of the said voids, but rather the downward excursion of the stylus will be limited by the sides 40 and 42 of the tip 28 contacting lateral edges 44 and 46 of the voids at surface 24 of the plate. To put this aspect of the invention another way, the conical tip 28 of the stylus may always descend within the void to a degree specifically limited by the separation d of those edges of the void at the surface 24 of the plate which contact the tip. Thus it is seen that the conical tip at 28a and 28b, which defines the "legs" of the character "A", descends to a relatively large excursion, while at the position designated 28c, which constitutes the bar of the script letter "t", the stylus descends a much lesser degree; and finally at the position designated 28d, the stylus as it passes over the relatively sharp termination of the script "t" descends but a miniscule distance within plate 18.

The net result of the foregoing sequence of events may be seen from examination of the right-hand side of FIG. 3, wherein the specific cuts which are effected by the homologous movements of cutting tip 32 of tool 14 are seen. From this it may be observed that the cut provided in piece 12, at various corresponding points such as 28a', 28b' and 28d', in all cases are defined by walls 50 which slope at the precise angle A' of cutting tip 32 to an apex 52 at the bottom of the said cut. In each instance, however, while the slope angle of the walls remains the same, the depth of the cut varies in accordance with the depth of descent of stylus 26. Accordingly, for example, it is seen that as one progresses to the right on the Figure, "thinner" and thinner lines are cut so that, as an example, the cut designated 28d' is close to being a "point". The latter cut, of course, corresponds to the point 29 of the letter "t" which is present if one regards the said letter "t" on plate 18 as residing merely in the surface of block 18; that is to say, if one ignores the deep cut 54 extending vertically downward in block 18. Accordingly, it will be evident from the foregoing, that a net result of the present process is that the two-dimensional characteristics of the graphics on plates 16 and 18 by which is meant the separation of the edges of the graphics as they appear on the surface 24 of the plate 16 and 18, has been converted into engraved letters at piece 12 having variations not only in width of their lines at the surface of the work piece, but moreover in corresponding depth. Thus, in this connection it will be appreciated that the total thickness 56 of the plates 16 and 18 is of significance to the invention, only in that a certain thickness is required to permit sufficient excursion for the stylus 28. Accordingly the voids need not necessarily be defined by vertical walls as illustrated extending into a solid block of material, but for example, a thin plate of material containing the voids defining the graphics, could be suitably spaced from an underlying surface so as to permit the required stylus excursions. This is to say that the plate 16 or 18 can function in an identical manner if it is internally hollow. This latter construction would of course, require support legs or the like, extending from "cut-off" portions of graphics to the underlying interior base of the hollow structures — e.g. to support the central circle of the letter "o". As will be discussed further hereinbelow, the piece 12, following the operations so far discussed, while per se constituting an attractive engraving having all the characteristics of a hand-engraved object, will generally be utilized with a pantograph 10, as a master for production of derivative works. Cut piece 12 may therefore be referred to hereinbelow as a "V-cut master", in recognition of the fact that the graphics thereon are indeed defined by V-cut channels, the depth of which varies in accordance with the width of the graphic at the surface of the master.

Figure 4:
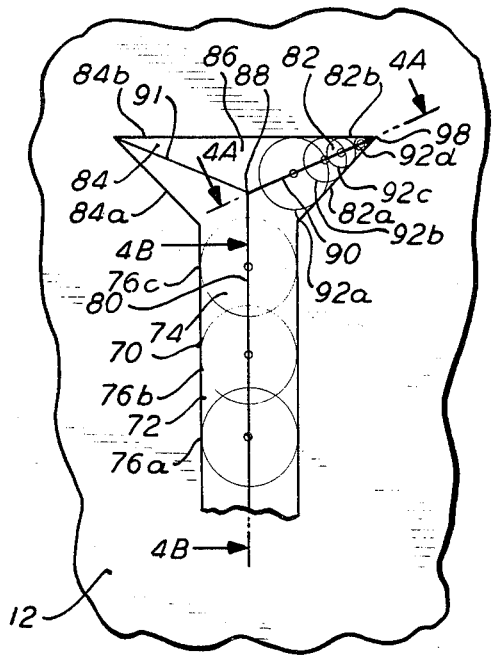
FIG. 4 is an enlarged plan view of a portion of a letter produced by the technique depicted in FIG. 3.

The graphic symbols depicted and discussion on connection with FIGS. 1 through 3 are intentionally of very simple configuration, in order to clarify certain principles of the method. In actual practice the principles of FIGS. 1 through 3 may, however, be utilized to produce graphic letters or a more involved nature, which may possess by virtue of their intricate construction, more aesthetically appealing characteristics. In FIG. 4 a plan view is thus set forth, illustrating the manner in which an intricate portion 70 of a graphic or the like may be in which an intricate portion 70 of a graphic or the like may be formed. In the showing therein, a part of work piece 12 is shown with portion 70 of a relatively complex engraved letter formed therein by the methods thus far discussed. In order to further assist in an understanding of the results achieved, a pair of profiles are projected from the view of FIG. 4; thus at FIG. 4A a cross-section taken along the direction 4A—4A appears and at FIG. 4B a profile taken along the direction 4B—4B is set forth.

Figure 4B:
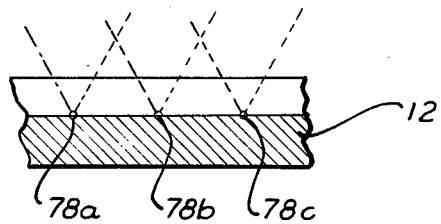
FIG. 4A and 4B are cross-sections taken in the respective directions of lines 4A—4A and 4B—4B of FIG. 4, and illustrate the profiles of the letter at certain portions thereof.
Figure 4A:
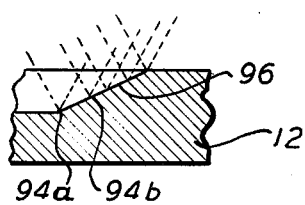

Referring firstly to the relatively straight portion 74 of the letter, there is shown by a series of circles, as at 76a, 76b and 76c. These are the loci of the cutting tool 32 which produces the form shown in FIG. 4. As also seen in the profile of FIG. 4B, the several loci corelate so that the bottom of the cutting tool provides a series of points as at 78a, 78b and 78c, which determine the straignt line 80 defining the bottom of the slope-walled (or V-cut) channel in the said portion 74 of the graphic.

Refering next to the foot portion of the graphic, which portion is designated generally at 86, it will be seen that such foot can be regarded as comprising the pair of converging sections 84 and 82. In each instance these converging portions may, for analysis, be regarded as bounded by a pair of converging lateral edges, as at 82a, 82b and at 84a and 84b, which define the graphic foot in the area of interest. In order to understand the characteristics of the graphic resulting from the present device, it will be seen by noting the pattern of the dotted circles (indicating once again the loci of the cutting tool) that the operator during formation of portion 74 moves the stylus 25 (FIG. 1 etc.) in such manner that upon reaching the approximate point at the stencil corresponding to point 88, he then proceed along line 90 (or 91); that is to say, that as he advances from point 88 the depth of excursion of the stylus and thus of the cutting tool now beomces limited by the edges 82a and 82b (or similarly by 84a and 84b in the case of portion 84). The stylus, and thus the cutting too, thereupon provide a series of loci as indicated, for example, at 92a, 92b and 92c etc., which become ever smaller. As further seen in the cross-sectional profile of FIG. 4A, the loci provided by the points 94a, 94b, etc. of the said cutter results in a line 96 at the bottom of the thereby cut channel, which line ascends toward the right (in the sense of the drawing), the total overall effect being to ultimately yield a rising V-cut channel coming to a point 98 at the extremity of the converging section of the cut graphic.

Figure 5:
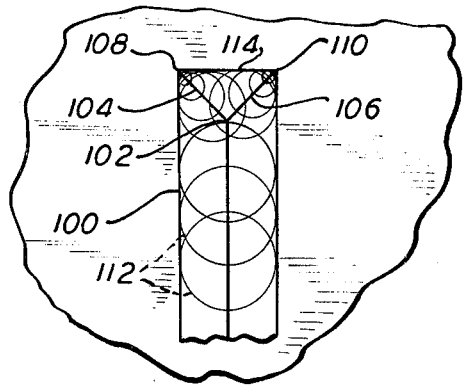
FIG. 5 is an enlarged plan view of a further letter form of graphic produced in accordance with the FIG. 3 method.

In FIG. 5 herein, a plan view is set forth, depicting how a square end of a letter or other graphic will, in most instances, actually be prepared by the methods of FIGS. 1 through 3. It will be understood that the square leg 100 of the graphic shown in FIG. 5 could, for example, be the bottom of the letter "A", in FIGS. 1 through 3. The same mode of presentation is shown in this plan view as is utilized in connection with FIG. 4, and therefore a full explanation is not deemed necessary herein. However, it should be noted that the cutting tool upon reaching the point 102 in the manner discussed in connection with FIG. 4, then proceeds (following in homologous fashion the tracing of the stylus at the stencil plate) along the line 104 and then line 106, toward the tips 108 and 110 of the said letter. Again, here it should be noted, that the various loci indicated by the dotted lines at 112 converge toward the tips 108 and 110 so as to provide a sharp edge at the respective corners. It will also be apparent upon consideration, that the bottom of the letter, that is the edge indicated at 114 is indeed substantially square and sharp, as may be appreciated from consideration of the overlapping loci 112 indicated adjacent 114. It should also be appreciated in this connection, that the precise contours of the walls of the cut graphic, particularly adjacent edges such as 114 are a precise mathematical function of the cutting techniques utilized in the invention, and are indeed thus defined.

In producing the V-cut master resulting at workpiece 12, it will in general be preferable to utilize an includes angle A for stylus tip 28 which is the same as that of cutting tip 32, since by matching such angles distortion is minimized. However the respective angles need not necessarily be the same. Thus differing angles may be utilized in order to achieve specific effects; for example, a smaller included angle A' at the cutting tip (in comparison to angle A of the stylus tip) would result in letters and other graphics of more sharply defined characteristics and generally narrower. The results in some cases, however, are aesthetically pleasing where such differing angles are so utilized. Similarly, and as is known generally in the art of the present pantograph type machines, differing ratios may be utilized between the degree of movement of the tool in comparison to the stylus. (Such is provided by suitably adjusting the pantograph linkage.) This principle, for example, may be utilized where one desires to enlarge or diminish the graphics at workpiece 12 in comparison to those in stencil plates 16 and 18.

In preparing the V-cut masters by the techniques of FIGS. 1 through 3, it will also be appreciated that even where the included angles of stylus and cutters are equal (in order to minimize distortion), the particular angle utilized has a marked effect on the resulting V-cut master. This is illustrated in the cross sectional view of FIG. 7.

In particular portion of a stencil plate 125 is shown, together with a portion of a V-cut master 127. A void 129, forming part of a graphic at plate 125 is illustrated, the void being relatively deep and narrow in order to better illustrate the effect of angle variation. Thus a conical-tipped stylus 131, having an included angle X is shown traversing void 129, and for comparison a stylus 133 subtending a greater included angle Y is shown in shadow. Angles X and Y are both sufficiently large that the descent of the respective styli are limited by the walls of void 129. Using in each instance conical cutters of the same included angles (as the stylus) the resulting V-cut channels are seen at 131' and 133'. The considerable difference in form of the resultant V-cut master will be evident — and it will be equally apparent that use of the said masters in production of derivative works yields highly different results.

As mentioned above, the V-cut master 127 of FIG. 7 (or similarly, the workpiece 12 of FIG. 3), preferably is the element now used in producing large numbers of derivative graphics. A preferable mode of operation is shown in the simplified partial views of FIGS. 6A and 6B. The V-cut master 60, which can be derived from the processes of FIGS. 1 through 3 is shown being traced by a conical-tipped stylus 28. Utilizing the same type of 3-D pantograph machine 10 heretofore discussed a conical-tipped cutter simultaneously traverses a workpiece 62—e.g. of wood — to produce a derivative engraving having all the characteristics of a hand-engraved object.

The V-cut channels of master 60 (e.g. as defined by walls 44 and 48a) may be effectively traversed by a conical-tipped stylus having an included angle no greater than that of the V-channel itself. This is better illustrated in the partial cross-sectional view of FIG. 8, where a stylus 135 having an included angle W, traverses a V-cut channel 137 of included angle Z at master 139. The angle W is considerably less than angle Z, whereby the vertical excursions of stylus 135 are limited primarily by the apexes of the V-cut. The resultant cut 141 in workpiece 143 will be identical to the shape of channel 137 — assuming that a conical cutter 145 of included angle Z is used in the same 3-D pantograph arrangement as heretofore discussed. It might be further noted here that it is indeed preferably for cutter 145 to have an included angle the same as that of channel 137 — in order to avoid or minimize distortion.

Figure 6A:
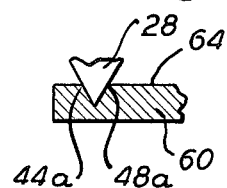
FIGS. 6A and 6B illustrate the manner in which a V-cut master in accordance with the invention may be utilized to produce corresponding derivative graphics.

Since the V-cut master will normally be utilized multiple times in the course of preparing derivative works, it is in fact preferable to utilize a stylus as in FIG. 6A, that is one having an included angle which matches the V-cut channel. This type of arrangement provides guiding surfaces at an extended portion of the conical stylus tip 28, which not only renders the tracing task easier, but more importantly greater reduces wear upon the master 60 — as compared to an arrangement like that of FIG. 8.

Figure 6B:
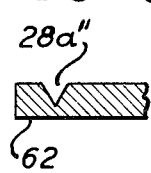

It should be appreciated in connection with FIGS. 6A, 6B and 8, that an important aspect of the present invention is that the V-cut masters are traversed by the respective styli in but a single-pass, the essential relationship between the V-cut master and the traversing stylus being that the stylus tip be guided by the bottom of the V-cut channel, thereby undergoing movement in three dimensions in accordance with the three dimensional meanderings of said channel bottom.

Finally it should be mentioned that while the V-cut masters utilized in the methods of FIGS. 6A, 6B and 8, are preferably prepared by the techniques of FIGS. 1 through 3, it is within the province of a further aspect of the invention, to produce V-cut masters having the same physical attributes by other methods, e.g. by casting, molding, etc., and thereafter use the resulting V-cut masters in the processes of FIGS. 6A, 6B and 8.

Accordingly while the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A method for carving three dimentional graphic intelligence upon workable stock, comprising:

preparing a master by positioning at the master object receiving bed of a three dimensional pantograph engraving machine, a stencil-plate carrying thereon voids the boundaries of which define graphics to be engraved on said stock; tracing the graphics on said plate, utilizing a conical-tipped stylus a the tracing element for said machine, the conical portion of said stylus having an included angle and axial length in relationship to said voids, such that said elements may traverse the entire graphic defined by its voids with the lateral edges of said cone at all times contacting and being limited in downward excursion by edges of said voids at the surface of said plate, whereby the vertical excursion of said conical element into said voids varies in accordance with the separation of said edges at said plate surface; selecting a first cutting tool having a conical tip whose included angle is different than the included angle of said first stylus, moving said first cutting tool into cutting engagement with the surface of said work stock in a homologous manner to the movement of said tracing element along said tracing templet, and cutting graphics on said work stock defined by a V-cut channel the boundaries of which at the plane surface of said work stock are geometrically similar to the said outline of said graphic on said stencil, and the depth of which at each point is similar to the vertical excursion of said tracing element passage through the voids defining said graphic at said stencil plate and the spacing between the edges of said voids at the surface of said work stock being different than the spacing between the corresponding voids on the surface of the stencil plate the resulting work stock thereby constituting said master;

positioning said master at said master object receiving bed;

tracing by a single pass through said V-cut channels, graphics on said master, utilizing as the tracing element for said machine a second conical tipped stylus having an included angle less than the included angle of said V-cut channels;

utilizing simultaneously as the work cutting tool moving in homologous fashion with said second stylus, a second rotating cutting tool, the tip of which is adapted to sweep a cone during rotation thereof, whereby with said second cutting tool in contact with a second piece of work stock a graphic is cut having an outline at the lane surface of said second piece of work stock which is geometrically similar to the outline of said graphic on said master, and which cut graphic has a depth at each point similar to the vertical excursion of said second tracing element during passage through the graphics on said master; and selecting said second cutting tool with an included angle that differs from the included angle of said second conical tipped stylus.

2. A method according to claim 1, wherein the included angle of said first cutting tool is less than the included angle of said first stylus.

3. A method according to claim wherein the included angle of said first cutting tool is greater than the included angle of said first stylus.

* * * * *